United States Patent
Kaidar et al.

(10) Patent No.: US 11,952,532 B2
(45) Date of Patent: Apr. 9, 2024

(54) SAGO-BASED FORMULATIONS FOR GEL APPLICATIONS INCLUDING CONFORMANCE CONTROL AND WATER SHUTOFFS

(71) Applicant: SAUDI ARABIAN OIL COMPANY, Dhahran (SA)

(72) Inventors: Ziyad Kaidar, Dhahran (SA); Abdulkareem Alsofi, Dhahran (SA); Amer Alanazi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 16/894,100

(22) Filed: Jun. 5, 2020

(65) Prior Publication Data

US 2021/0380866 A1 Dec. 9, 2021

(51) Int. Cl.
*E21B 33/138* (2006.01)
*C09K 8/514* (2006.01)
*C09K 8/516* (2006.01)
*C09K 8/588* (2006.01)

(52) U.S. Cl.
CPC ............. *C09K 8/514* (2013.01); *C09K 8/516* (2013.01); *C09K 8/588* (2013.01); *E21B 33/138* (2013.01)

(58) Field of Classification Search
None
See application file for complete search history.

(56) References Cited

U.S. PATENT DOCUMENTS

| | | | |
|---|---|---|---|
| 2,600,404 A | 6/1952 | Hoeppel | |
| 3,993,570 A * | 11/1976 | Jackson | C09K 8/08 507/111 |
| 8,937,034 B2 | 1/2015 | Svoboda et al. | |
| 2007/0034827 A1 * | 2/2007 | Li | A61K 9/4816 252/79.1 |
| 2010/0294498 A1 * | 11/2010 | Svoboda | E21B 21/003 166/305.1 |
| 2018/0051096 A1 * | 2/2018 | Shah | C08B 30/12 |
| 2018/0201820 A1 | 7/2018 | Eyaa Allogo et al. | |
| 2019/0127629 A1 | 5/2019 | Eluru et al. | |

FOREIGN PATENT DOCUMENTS

| | | |
|---|---|---|
| EP | 0216091 A2 | 4/1987 |
| EP | 3109259 A1 | 12/2016 |
| GB | 2110699 A | 6/1983 |
| WO | 0121726 A1 | 3/2001 |

OTHER PUBLICATIONS

International Search Report and Written Opinion issued in Application No. PCT/US2020/040987, dated Feb. 22, 2021 (12 pages).
Ehara, Hiroshi, et al. "Sago Palm, Multiple Contributions to Food Security and Sustainable Livelihoods", Springer Open. 2018, pp. 1-317, [317 Pages].
Ahmad, Fasihuddin B., et al. "Physico-chemical characterisation of sago starch", Carbohydrate polymers, Elsevier. Apr. 1999, pp. 361-370, [10 Pages].

* cited by examiner

*Primary Examiner* — Charles R Nold
(74) *Attorney, Agent, or Firm* — Osha Bergman Watanabe & Burton LLP

(57) ABSTRACT

Formation treatment fluid compositions and methods are provided that include an aqueous base fluid, where the aqueous base fluid comprises one or more salts; and sago. The profile modification fluid may include sago in an amount in the range from 50,000 ppm to 100,000 ppm. Formation treatment fluid compositions may also include an aqueous base fluid, where the aqueous base fluid comprises one or more salts, and sago, where the formation treatment fluid may include sago in an amount in the range from 10,000 ppm to 50,000 ppm. Methods for using the formation treatment fluid may include introducing into a targeted stratum of a subterranean formation a treatment fluid. The subterranean treatment fluid may include an aqueous base fluid, where the aqueous base fluid includes one or more salts, sago, and the treatment fluid may include sago in an amount in the range from 10,000 ppm to 100,000 ppm.

11 Claims, No Drawings

SAGO-BASED FORMULATIONS FOR GEL APPLICATIONS INCLUDING CONFORMANCE CONTROL AND WATER SHUTOFFS

BACKGROUND

Excessive water production in mature oil and gas fields imposes a major challenge for achieving efficient oil recovery. The economic viability of many wells are shortened as a result of the excessive production cost associated with water production. These expenses can include lifting, handling, separation, and disposal. The unwanted water production uses up the natural drive and in some circumstances can result in the possible abandonment of the production well. Excessive water increases the risk of formation damage, and also produces a higher corrosion rate.

Well formation conformance issues can occur during water flooding with poor sweep efficiency, which may result in a pocket of oil unrecovered and left behind. Oil reservoir formations with high permeability channels that exists within the matrix-rock reservoir have been identified as the most prevalent feature for this problem. When injecting water into reservoirs, water conventionally will flow to a production wellbore through a path of least resistance to the regions with relatively higher permeability. Under such circumstances, the oil may be bypassed by water in high permeability regions, leaving upswept hydrocarbons in regions with relatively lower permeability. Excessive water production is also related to conformance issues within a hydrocarbon bearing formation. Conformance control and water shut-off have been defined as a treatment measure of excess water production, and are associated with improvements in sweep efficiency during oil recovery phases of a wells production life.

In the industry, zonal isolation techniques are commonly used to shut-off problematic zones such as zones with high water cut. Gel-based treatment fluids for water shutoff is an effective method to plug such problematic zones. However, the relatively high cost of associated chemicals limit their wide and extensive implementation. In addition, most gelants consist of two different chemical components (i.e. a polymer and a cross-linker). The complexity and nature of conventional gelant compositions increases the logistical burden and associated costs. Moreover, the two components of conventional gel-based solutions need to be mixed at certain concentrations to provide the required gel setting time and strength to achieve the necessary shutoff effect. Such mixing adds a further burden to the technology deployment at the well site.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a profile modification fluid that includes: an aqueous base fluid, where the aqueous base fluid comprises one or more salts; and sago. The profile modification fluid may include sago in an amount in the range from 50,000 ppm to 100,000 ppm.

In a further aspect, embodiments disclosed herein relate to a formation treatment fluid including an aqueous base fluid, where the aqueous base fluid comprises one or more salts, and sago. The formation treatment fluid may include sago in an amount in the range from 10,000 ppm to 50,000 ppm.

In another aspect, embodiments disclosed herein relate to a formation treatment method including introducing into a targeted stratum of a subterranean formation a treatment fluid. The subterranean treatment fluid may include an aqueous base fluid, where the aqueous base fluid includes one or more salts, and sago. The treatment fluid may include sago in an amount in the range from 10,000 ppm to 100,000 ppm Other aspects and advantages of the claimed subject matter will be apparent from the following description and the appended claims.

DETAILED DESCRIPTION

Embodiments in accordance with the present disclosure generally relate to methods and compositions of a formation well treatment fluid that contains a sago biopolymer material that may be utilized in near-wellbore isolation applications, such as to improve profile modification, conformance control, water shut-off treatments, and also in enhanced oil recovery, or to abandon a particular zone, shut-off natural or propped fractures or otherwise alter the permeability of the subterranean formation. Methods of one or more embodiments may include placing a formation treatment fluid comprising sago biopolymer inside a hydrocarbon containing subterranean formation. In one or more embodiments, the formation treatment fluid may be a profile modification fluid or a conformance control fluid.

Embodiments in accordance with the present disclosure may relate to methods and compositions of a biopolymer gelant prepared from a sago material for use in various downhole applications, such as for conformance control, profile modification, and water shutoffs. In one or more embodiments, the natural biopolymer gelant includes sago biopolymer prepared from sago containing trees or plant products including, for example, by extracting sago starch from a tropical palm stem. Embodiments in accordance with the present disclosure also relate to methods of treating a subterranean formation penetrated by a wellbore with the modified aqueous-based formation treatment fluid including the sago biopolymer gelant. Advantageously, use of sago biopolymer gelants according to embodiments herein may not require a cross-linker for the additive to gel, contrary to the needs of most commercial gels.

In one or more embodiments, the formulations may be used in low-viscosity aqueous solutions or gels having an increased viscosity that experience gelation upon heat treatment. The resulting sago gels demonstrate increased stability under common wellbore temperature and pressure conditions, making them highly suitable for use in downhole environments.

In one or more embodiments, formation treatment fluids and methods may relate to blocking, plugging, or sealing a water or gas producing zone of a well. The developed conformance control composition and treatment includes the utilization of environmentally beneficial chemistry that incorporates biopolymers from natural products in the form of a sago biopolymer gelant and a base aqueous fluid including one or more salts, and the injection of such a fluid in a treatment zone of a well. The formation treatment fluids of one or more embodiments of the present disclosure are non-toxic, biodegradable, and environmentally acceptable. The developed treatment is useful for bottom hole static temperatures of up to at least 120° C., and up to 150° C. in some embodiments. In one or more embodiments, the developed treatment is useful for bottom hole static temperatures of up to 105° C.

Embodiments of this disclosure also relate to formation treatment fluid compositions and methods for providing a gelation solution with a tailorable gelation time. Compositions and methods of this disclosure provide a gel with increased control over gelation time that can eliminate the need of retardant (an expensive chemical) to control gelation time, is environmental friendly and cost effective, and minimizes formation damage.

In one or more embodiments, a gel may be defined as a formed network of interconnected molecules, such as a crosslinked polymer. The network gives a gel phase its structure and an apparent yield point. At a molecular level, a gel is a dispersion where both the network of molecules and the liquid is continuous. A gel is a semi-solid state or phase that can have properties ranging from soft and weak to hard and tough.

In one or more embodiments of the present disclosure, the formation treatment fluid compositions include sago biopolymer gelants at or below about 50,000 ppm concentration. At such concentrations, the composition may not form a strong gel, but rather a high viscous fluid that can be utilized for polymer flooding applications in enhanced oil recovery.

In this disclosure, formation treatment fluid compositions including sago biopolymer at or above about 50,000 ppm concentration may result in the formation of sago-based gels that may be utilized for near-wellbore isolation jobs in oil and gas wells, such as water shut-off and profile modification. Sago is a biopolymer type originated from plants as starches. Sago-based gels as demonstrated in the present disclosure, are shown to form robust gels under a wide range of downhole temperatures when used at high concentration.

Base Fluid

An aqueous base fluid may be any suitable fluid such as water or a solution containing both water and one or more organic or inorganic compounds dissolved in the water or otherwise completely miscible with the water. The aqueous fluid in some embodiments may contain water, including freshwater, well water, filtered water, distilled water, sea water, salt water, produced water, formation brine, other type of water, or combinations of waters. In embodiments, the aqueous fluid may be a brine, including natural and synthetic brine. The aqueous fluid may include water-soluble organic compounds, such as alcohols, organic acids, amines, aldehydes, ketones, esters, or other polar organic compounds for example, or salts dissolved in the water. In some embodiments, the aqueous fluid may include salts, water-soluble organic compounds, or both as impurities dissolved in the water.

In one or more embodiments, the sago biopolymer may be added to a treatment fluid including aqueous-based fluids such as those including water based fluids, salt water and brines, and any other aqueous based treatment fluids known to those skilled in the art. The aqueous fluid may contain fresh water formulated to contain various salts. The salts may include, but are not limited to, alkali metal and alkaline earth metal halides and hydroxides. In one or more embodiments, brines may be any of seawater, aqueous solutions wherein the salt concentration is less than that of seawater, or aqueous solutions wherein the salt concentration is greater than that of seawater. Salts that are found in seawater may include barium, sodium, calcium, aluminum, magnesium, potassium, strontium, and lithium salts of halides, carbonates, sulfates, chlorates, bromates, nitrates, oxides, phosphates, among others. Any of the aforementioned salts may be included in brine. In one or more embodiments, the density of the aqueous fluid may be controlled by increasing the salt concentration in the brine, though the maximum concentration is determined by the solubility of the salt. In particular embodiments, brine may include an alkali metal halide or carboxylate salts and/or alkaline earth metal carboxylate salts.

In one or more embodiments, the formation treatment fluid may comprise the one or more salts in an amount that results in a total dissolved salt concentration (TDS) in the range from about 40,000 to 75,000 ppm. For example, the formation treatment fluid may contain the one or more salts in an amount ranging from a lower limit of any of 40,000, 43,000, 48,000, 52,000, 55,000, 58,000, and 60,000 ppm TDS to an upper limit of any of 57,000, 60,000, 62,000, 65,000, 68,000, 70,000, 72,000, and 75,000 ppm TDS, where any lower limit can be used in combination with any mathematically-compatible upper limit.

In one or more embodiments, the modified aqueous formation treatment fluid may contain sago materials that may increase the viscosity of the treatment fluid and at elevated concentrations may result in the gelation of the treatment fluid to produce a robust gel. Sago starch may be derived from the stem of palms and the resulting gel that may be formed in accordance with one or more embodiments of the present disclosure may be prepared via mixing sago starch biopolymer materials with an aqueous brine and subjecting the mixture to elevated temperatures above 25° C. (above ambient conditions). In one or more embodiments, increasing the temperature may increase the rate of gelation. The simplicity of the mixture components and methods may serve to reduce any additional operation procedures or burdens at the wellbore site.

Sago is a biochemical (biopolymer) extracted from the stems of various tropical palm trees. In terms of its composition, it is a mixture of compounds including, for example, water, protein, fat, and fiber contents. The sago product can be very rich in sago starch (a polysaccharide). Beneficially, sago is abundant in nature, and as such, it represents an agricultural commodity that is produced in mass for large-scale use, primarily within agricultural industries.

Sago products, in accordance with one or more embodiments of the present disclosure, contain both components of a conventional gel formula, including both a cross-linker and a biopolymer. Additionally, without being limited to any particular theory, the presence of fiber in the sago product may contribute to the improvement in the resulting gelant properties. The sago-based gelant, of one or more embodiments disclosed here, may be utilized for near-wellbore isolation jobs in oil and gas wells, such as water shut-off and profile modification. Sago fiber materials can be mixed with an aqueous solution including one or more salts, or a brine, at varying concentrations depending on the specific use of treatment fluid. In one or more embodiments, the solution including the sago fiber materials may be mixed using a mixer. In some embodiments, the treatment fluid may be mixed in the field using suitable mixing tanks capable of controlling the temperature of the treatment fluid at the surface.

In one or more embodiments, the formation treatment fluid may comprise the sago component in an amount of the range of about 1,000 to 100,000 ppm. For example, the formation treatment fluid may contain sago component in an amount ranging from a lower limit of any of 1,000, 10,000, 20,000, 30,000, 35,000, 40,000, 45,000, and 50,000 ppm to an upper limit of any of 40,000, 45,000, 50,000, 55,000, 60,000, 70,000, 80,000, 90,000, and 100,000 ppm, where any lower limit can be used in combination with any mathematically-compatible upper limit. By modifying the amount of sago added, the resulting properties of the sago gel can be tailored to select specific viscosities and gel hardness or softness. In one or more embodiments, when the formation treatment fluid contains sago in amount less than 50,000 ppm, a more viscous gelled fluid may be formed with moderate flow-ability.

In one or more embodiments the gelation time of the modified aqueous formation treatment fluid may be tailored by controlling the concentration of the sago component in the treatment fluid. When subjected to elevated temperatures, for example, at 90° C., the gelation time may be about 1 hour at sago concentrations greater than 70,000 ppm, the gelation time may be about 1.5 hour at sago concentrations ranging from about 40,000 to about 70,000 ppm, and the gelation time may be about 2 hours at sago concentrations of less than about 40,000 ppm.

Embodiments of the present disclosure relate to a modified aqueous-based formation treatment fluid including sago biopolymer and one or more salts. In some embodiments, a solution of the sago biopolymer(s) in an aqueous base fluid including one or more salts may initially have a viscosity similar to that of water. A water-like viscosity may allow the solution to effectively penetrate voids, small pores, and crevices, such as encountered in fine sands, coarse silts, and other formations. In some embodiments, the viscosity of the aged treatment fluids may be varied to obtain a desired degree of flow sufficient for decreasing the flow of water through or increasing the load-bearing capacity of a formation. The viscosity of the solution may increase with time and with the application of temperatures above ambient conditions that serve to establish an activating temperature to form a gel or more viscous formation treatment fluid.

The solution viscosities discussed here refer to the solution prior to gelation. Prior to gelation, the gelant solution behavior shall mimic that of any polymer. Accordingly, the only abrupt increase (where rate of viscosity increase per additional concentration) shall take place at the overlap concentrations. The overlap concentration for polymers are typically low (i.e., around 100s of ppm). This value represents the concentration at which there is significant interactions (overlap) between the polymer molecules (chains) which increases viscosification effects.

The desired viscosity of the resulting formation treatment fluid, prior to gelation may be case dependent, and specific to the particular application of use. In general, the modified aqueous formation treatment fluid may be tailored to provide a sufficient increase in viscosity (of about two orders of magnitude compared to conventional injection fluids, e.g. water) as required to affect any diversion of treatment fluid. For example, in one or more embodiments, at sago concentrations below 50,000 ppm, the resulting modified aqueous formation treatment fluid may maintain a fluid form with an initial viscosity (prior to gelation) at 25° C. that is of the range of about 20 to 100 cP, a viscosity at 40° C. that is of the range of about 10 to 85 cP, a viscosity at 60° C. that is of the range of about 5 to 60 cP, and a viscosity at 90° C. that is of the range of about 1 to 40 cP. Additionally, for example, the formation treatment fluids may have a viscosity at 90° C. that is of an amount ranging from a lower limit of any of 1, 3, 5, and 10 cP to an upper limit of any of 15, 20, 25, and 30 cP, where any lower limit can be used in combination with any mathematically-compatible upper limit. More specifically, the concentration and temperature of the fluid may affect or alter the measured viscosity of the formation treatment fluid.

The well treatment fluid according to embodiments herein may include, as noted above, an aqueous base fluid, salt, and sago. As sago includes both a cross-linker and a gellable starch, well treatment fluids according to embodiments herein may consist of or consist essentially of an aqueous base fluid, salt, and the sago component. For example, well treatment fluids according to embodiments herein may consist of sea water having 50,000 to 70,000 ppm TDS and 50,000 ppm to 100,000 ppm sago.

The formation treatment fluid of one or more embodiments of the present disclosure may contain materials to provide various characteristics and properties to the fluid. The formation treatment fluid may contain one or more viscosifiers or suspending agents in addition to the sago based polymer, weighting agents, proppants, corrosion inhibitors, soluble salts, biocides, fungicides, seepage loss control additives, bridging agents, deflocculants, lubricity additives, shale control additives, pH control additives, and other additives as desired. In one or more embodiments, the well treatment fluid can also contain one or more materials that function as encapsulating or fluid loss control additives.

In one or more embodiments, the drilling fluid may have a pH ranging from 3, 4, 4.5, 5, 5.5, 6, 6.5, 7, 7.5, 8, 8.5, 9, 9.5, and 10 to 6, 6.5, 7, 7.5, 8, 8.5, 9, 9.5, 10, 10.5 and 11, where any lower limit may be combined with any mathematically feasible upper limit.

In some embodiments, the formation treatment fluid composition described in the disclosure may be introduced (for example, pumped) downhole to enhance oil recovery in a hydrocarbon reservoir formation. For example, a formation treatment fluid composition having a sago biopolymer and a brine having a TDS concentration in accordance with one or more embodiments provided here, may be prepared at the surface and introduced downhole to enhance oil recovery from a hydrocarbon reservoir formation.

In one or more embodiments, the injection of the sago comprising treatment fluid can be conducted using conventional chemical injection methods that utilize mixer tanks to prepare the gel solution above ground prior to injection of the treatment fluid. The sago-based gel solution can then transform into a gel after a prescribed gel time that is specific the target zone.

From a perspective of solution injection, the gelant solution initial viscosity (prior to gelation) is maintained low to practically inject the solution without significantly limiting injection rates.

The reaction of the biopolymer and the salt water may produce gels having a consistency ranging from a viscous sludge to a hard gel. In some embodiments, the reaction of the sago biopolymer and the salt water may result in a soft elastic gel. The consistency of the gel determines the force necessary to break the gel structure, which may be quantified by measuring the force required for a needle to penetrate the crosslinked structure of the formed reacted gelant.

Some embodiments of the present disclosure relate to sago-based gels that may be formed in subterranean formations, where the sago component including the starch biopolymer and aqueous saline base fluid mixture may be placed or injected into a targeted subterranean formation areas prior to curing of the gel. In one or more embodiments, the gel curing time and initial solution viscosities may be adjusted by changing the concentration of the sago biopolymer and salts. In one or more embodiments, the gel curing time may be controlled by injecting the treatment fluid into the formation at an initial temperature of less than about 30°

C. In one or more embodiments, the sago containing treatment fluid forms a gel after curing at a temperature ranging from 30 to 300° C.

In one or more embodiments, the gel solution may be injected into the formation at a pumping rate and pressure that should be below the formation parting pressure. In addition, high injection rates can yield shear degradation. If necessary, low shear valves can be used to minimize such degradation. Salinity of the used brine and to a lesser extent (which depend on the degree of dispersion or in-situ mixing) salinity of the brine in the formation will also affect the gelation process.

In one or more embodiments, where gel treatments have been injected into subterranean hydrocarbon bearing formations, formed gels may be used to divert fluid flow from water channels to formation matrix. Fluids tend to flow from high permeability and low oil saturation zones and will normally bypass low permeability zones with high oil saturation. Sago-gel treatments, as described in one or more embodiments of the present disclosure can alter this behavior, and enhance oil production by improving flood sweep efficiency.

In one or more embodiments, the target zone of the subterranean formation to be treated is a water-producing zone of a producing well. The methods of one or more embodiments of the present disclosure can be used to control water production from the zone, thereby promoting hydrocarbon production. In one or more embodiments, the methods can be used for reducing or shutting off water production from such a target zone in a well. In one or more embodiments, the formation treatment fluid may be introduced into one or more injection wells. The presence of the fluid of the present disclosure in the permeable zones serves to substantially block or seal the flow pathways of the water or subsequently injected fluids through the permeable zones. In one or more embodiments, the formation treatment fluid may be introduced and gelled at a portion of the formation that before treatment exhibits excessive water production which can be plugged to a retained permeability of less than 0.1%.

One or more embodiments of the present disclosure may relate to the application of formation treatment fluids to combat thief or high permeability zones of a formation, and embodiments disclosed here include sago-based gels that may be injected into the formation. Sago-based gels injected into the formation may partially or wholly restrict flow through the highly conductive zones. In this manner, the sago-based gels may reduce channeling routes through the formation, forcing the formation treatment fluid through less porous zones, and potentially decreasing the quantity of treating fluid required and increasing the oil recovery from the reservoir.

Embodiments of the gels disclosed herein may be used to enhance secondary oil recovery efforts. In secondary oil recovery, it is common to use an injection well to inject a treatment fluid, such as water or brine, downhole into an oil-producing formation to force oil toward a production well. Thief zones and other permeable strata may allow a high percentage of the injected fluid to pass through only a small percentage of the volume of the reservoir, for example, and may require an excessive amount of treatment fluid to displace a high percentage of crude oil from a reservoir.

Chemical EOR (enhanced oil recovery) applications in accordance with one or more embodiments of the present disclosure are water-based and use chemicals such as biopolymers, alkaline and alkali salts, or combinations thereof dissolved in water and co-injected. The water source may be derived from freshwater, (for example, aquifers or surface water), saltwater/brackish sources on the surface (for example, river/sea water mixtures), or in water reservoirs (for example, aquifer water or brines coproduced from oilfield reservoirs). When used, the viscous formation treatment fluid including the sago biopolymer can be utilized for causing movement of oil in the flow direction of the fluids as they pass from an injection well through a reservoir containing the oil to a production well.

The hydrocarbon-containing formation of one or more embodiments may be a formation containing multiple zones of varying permeability. For instance, the formation may contain at least a zone having a relatively higher permeability and a zone having a relatively lower permeability. Pore systems may include permeability profiles such as matrix low permeability, matrix medium-high permeability, and fractures of higher permeability. High permeability zones can be in the form of thief zones, high permeability strikes, or fractures. During conventional injection, fluids preferentially sweep the higher permeability zone, leaving the lower permeability zone incompletely swept. In one or more embodiments, the generated formation treatment fluid may plug the higher permeability zone, allowing subsequent fluid to sweep the low permeability zone and improving sweep efficiency.

In one or more embodiments, the sago-based formation treatment fluid may be injected and the viscosity may change in-situ over time within the formation to form a viscous flooding agent to combat thief or high permeability zones. These sago-based higher fluidity gels include sago biopolymer comprising starch components that may be injected into the formation at lower concentrations, allowing the biopolymers and naturally contained cross-linkers in the sago material to penetrate further into the formation than if a higher concentration gel was injected.

Examples

The following examples are merely illustrative and should not be interpreted as limiting the scope of the present disclosure.

Table 1 provides data that was acquired from examples 1-10 that were prepared with varying amounts of the sago component ranging from 10,000 ppm sago to 100,000 ppm sago. The sago polymer was mixed with an aqueous base fluid, a salt, and subjected to aging at a temperature of 90° C. The formation treatment fluid samples of Table 1 further included a salt profile and concentration of 57,612 ppm TDS. The mixtures were monitored and the time to gelation was recorded, as shown in Table 1. The compatibility of the mixture was also monitored to ensure that the mixtures did not undergo phase separation or precipitation.

Below 50,000 ppm concentration, sago does not form a strong gel but rather it produces a high viscous fluid that can be utilize for viscous EOR flooding similar to polymer flooding. The gelation tests results are illustrated in Tables 1-3 below. The gelation times provided in Table 1 were very short compared to other gel systems, around 1-2 hrs.

In the following Examples, two different systems were applied to study the formulated sago polymer comprising solutions. The two methods of characterization included bottle testing and rheometry. Bottle testing was conducted by visualizing the state of the developed gel at specific periods and temperatures, as shown in Table 1. In bottle testing, gels can be observed and classified as defined in a well-known scale to describe gels, known as the Sydansk scale. The results of Examples 1-10 are characterized and qualified in view of this scale as demonstrated in Table 1. A rheometer was used as discussed below to measure the viscoelastic properties of the system, as shown in Tables 2 and 3.

The results presented in Table 1 clearly demonstrate that when the TDS concentration is held constant, and the sago concentration is increased, there is a decrease in the gel formation time as well as a shift from a highly flowing viscous polymer gel fluid to a harder more rigid gel formed at the higher sago concentration levels. The solutions containing sago at less than 40,000 ppm were observed to still be highly flowing after 2 hours of ageing at 90° C.

TABLE 1

Gelation time and sago gel properties as a function of sago concentration.

| Example | Concentration (ppm) | Gelation time (hours) | Description |
|---|---|---|---|
| 1 | 10000 | 2 | Highly flowing gel. Gel appears to be slightly more viscous than the original polymer solution |
| 2 | 20000 | 2 | |
| 3 | 30000 | 2 | |
| 4 | 40000 | 1.5 | Moderately flowing gel. About 5 to 15% of the gel dose not freely flow to the bottle top upon flipping upside down. |
| 5 | 50000 | 1.5 | |
| 6 | 60000 | 1.5 | Rigid gel: there is no gel-surface deformation upon inversion; and the gel is stable and clear. |
| 7 | 70000 | 1 | |
| 8 | 80000 | 1 | |
| 9 | 90000 | 1 | |
| 10 | 100000 | 1 | |

At a same salinity, gelation time is longer at lower sago concentration, and the difference in gelation time is directly associated with the sago concentration. This relationship of longer gelation time at lower sago concentration is therefore proposed as a convenient strategy for delaying gelation process. For field application, the reservoir can optionally be pre-flushed with fresh water to condition the reservoir for gel treatment. A tailorable sago biopolymer concentration in the formation treatment fluid can then be selected to prepare a gelation solution based on the specific requirement for gelation time. Salinity of the brine may also be varied in the gel mixture to alter the desired gelation time.

Table 2 contains results from a comparative experiment that was conducted to demonstrate and compare the initial viscosities of solutions prepared from conventional biopolymers and sago biopolymer formation treatment fluids. Comparative Example 1 is a modified aqueous based formation treatment fluid prepared with a salt concentration of 57,612 ppm TDS, and 2,000 ppm Welan Gum (exopolysaccharide). Comparative Example 2 is a modified aqueous-based formation treatment fluid prepared with a salt concentration of 57,612 ppm TDS, and 2,000 ppm BIO VIS. Example 11 is a modified aqueous-based formation treatment fluid prepared with a salt concentration of 57,612 ppm TDS, and 2,000 ppm sago biopolymer.

As indicated above, the viscosity measurements are for solutions prior to ageing. The temperatures provided in Table 2 are the temperatures at which rheometry was conducted while the temperature was increased to 90° C. Viscosities were measured using an Anton Par rheometer and viscosity measurements were obtained at a shear rate of 6.8 1/s are reported below in Tables 2 and 3. As shown in Table 2, in comparison to Comparative Examples 1 and 2, Example 11 is demonstrated to have a decreased viscosity at both 60 and 90° C.

Table 2. Viscosity comparison with other conventional polymers of the art

TABLE 2

Viscosity comparison with other conventional polymers of the art.

| | | Viscosity (mPa · s) | |
|---|---|---|---|
| Example | Biopolymers (2000 ppm) | 60° C. | 90° C. |
| Comparative Example 1 | WELAN GUM | 75.8 | 55.79 |
| Comparative Example 2 | BIO VIS | 3.31 | 2.02 |
| Example 11 | SAGO | 5.01 | 3.2 |

Examples 12-14 were prepared similarly to examples 1-10 where a modified aqueous based formation treatment fluid was prepared with a salt concentration of 57,612 ppm TDS, and a respective amount of sago biopolymer as detailed in Table 3. Table 3 further contains viscosity measurements for Example compositions 12-14 with varying sago concentrations, where the initial viscosity measurements were obtained at multiple temperatures to demonstrate how the initial viscosity of the formation treatment fluid may change with both sago concentration and temperature.

TABLE 3

Initial viscosity data at varying temperature.

| Example # | Conc. [ppm] | Viscosity (mPa · s) | | | |
|---|---|---|---|---|---|
| | | 25° C. | 40° C. | 60° C. | 90° C. |
| 12 | 20000 | 30.5 | 22.8 | 16.9 | 11.1 |
| 13 | 30000 | 50.8 | 39.6 | 25.8 | 16.3 |
| 14 | 40000 | 93.9 | 77.2 | 50.9 | 33.8 |

The Examples above demonstrate the advantageous features and potential use of sago biopolymer material in treatment fluids.

The formation treatment fluid of the present disclosure includes a sago-based gel system to be used for water shutoff, profile modification, deep fluid diversion, and viscous EOR flooding application. This gel system is eco-friendly, being formed of a biopolymer sago component while also cheap compared to other existing systems of gel-based water shutoff.

Ranges may be expressed in the disclosure as from about one particular value, to about another particular value, or both. When such a range is expressed, it is to be understood that another embodiment is from the one particular value, to the other particular value, or both, along with all combinations within said range. For example, every range of values (in the form of from "a to b," or "from about a to about b," or "from about a to b," and any similar expressions, where "a" and "b" represent numerical values of degree or measurement) is to be understood to set forth every number and range encompassed within the broader range of values.

Although the preceding description has been described herein with reference to particular means, materials and embodiments, it is not intended to be limited to the particulars disclosed herein; rather, it extends to all functionally equivalent structures, methods and uses, such as are within the scope of the appended claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A profile modification fluid consisting essentially of:
   an aqueous base fluid,
      wherein the aqueous base fluid comprises water and one or more salts; and
   a sago biopolymer gelant,
      wherein the profile modification fluid comprises the sago biopolymer gelant in an amount in the range from 60,000 ppm to 90,000 ppm, and
      wherein the aqueous base fluid comprises from 50,000 to 70,000 ppm total dissolved salts, and
      wherein the sago biopolymer gelant comprises an extract of a tropical palm, wherein the extract comprises natural sago biopolymer and natural components from the tropical palm, wherein the natural sago biopolymers is sago starch, and wherein the natural components are selected from the group consisting of sago protein, sago fat, sago fiber, and combinations thereof.

2. The profile modification fluid of claim 1, wherein the profile modification fluid has an initial viscosity at 90° C. of 1 to 40 cP.

3. The profile modification fluid of claim 2, wherein the profile modification fluid forms a gel after curing at a temperature ranging from 30 to 300° C.

4. The profile modification fluid of claim 3, wherein the gelled profile modification fluid has a viscosity of two to three orders of magnitude greater than the initial viscosity.

5. The profile modification fluid of claim 1, wherein the one or more salts are selected from sodium, barium, calcium, aluminum, magnesium, potassium, strontium, and lithium salts of halides, carbonates, chlorates, bromates, nitrates, oxides, phosphates, or mixtures thereof.

6. The profile modification fluid of claim 1, wherein the sago starch and the natural components are as present from the tropical palm.

7. A formation treatment fluid consisting of:
   an aqueous base fluid,
      wherein the aqueous base fluid comprises one or more salts; and
   a sago biopolymer gelant,
      wherein the formation treatment fluid comprises the sago biopolymer gelant in an amount in the range from 10,000 ppm to 50,000 ppm, and
      wherein the sago biopolymer gelant comprises an extract of a tropical palm, wherein the extract comprises natural sago biopolymer and natural components from the tropical palm, wherein the natural sago biopolymers is sago starch, and wherein the natural components are selected from the group consisting of sago protein, sago fat, sago fiber, and combinations thereof.

8. The formation treatment fluid of claim 7, wherein the formation treatment fluid forms a viscous fluid after ageing at a temperature ranging from 30 to 300° C.

9. The formation treatment fluid of claim 7, wherein the formation treatment fluid has an initial viscosity at 90° C. of 1 to 40 cP.

10. The formation treatment fluid of claim 7, wherein the one or more salts are comprised in an amount ranging from 40,000 to 75,000 ppm TDS.

11. The formation treatment fluid of claim 7, wherein the one or more salts are selected from sodium, barium, calcium, aluminum, magnesium, potassium, strontium, and lithium salts of halides, carbonates, chlorates, bromates, nitrates, oxides, phosphates, or a mixture thereof.

* * * * *